(12) United States Patent
Spivak

(10) Patent No.: US 6,353,781 B1
(45) Date of Patent: Mar. 5, 2002

(54) GPS CONTROLLED MARINE SPEEDOMETER UNIT WITH MULTIPLE OPERATIONAL MODES

(75) Inventor: Paul Spivak, Elyria, OH (US)

(73) Assignee: Nordskog Publishing, Inc., Oxnard, CA (US)

( * ) Notice: Subject to any disclaimer, the term of this patent is extended or adjusted under 35 U.S.C. 154(b) by 0 days.

(21) Appl. No.: 09/609,963

(22) Filed: Jul. 5, 2000

(51) Int. Cl.[7] .............................. G01S 1/08; G01S 5/02
(52) U.S. Cl. ...................... 701/21; 73/178 R; 340/851; 701/200
(58) Field of Search ............................ 701/21, 200, 213; 340/851; 73/178 R

(56) References Cited

U.S. PATENT DOCUMENTS

| | | | |
|---|---|---|---|
| 4,590,570 A | | 5/1986 | Rader |
| 5,187,978 A | | 2/1993 | Tendler |
| 5,351,059 A | * | 9/1994 | Tsuyuki ....................... 342/457 |
| 5,355,140 A | * | 10/1994 | Slavin et al. ................ 342/386 |
| 5,418,537 A | * | 5/1995 | Bird ............................ 342/357 |
| 5,491,636 A | | 2/1996 | Robertson et al. |
| 5,642,285 A | * | 6/1997 | Woo et al. ................... 701/213 |
| 5,731,788 A | * | 3/1998 | Reeds .......................... 342/357 |
| 5,884,213 A | | 3/1999 | Carlson |
| 5,977,884 A | | 11/1999 | Ross |
| 5,991,722 A | | 11/1999 | Thompson et al. |
| 6,031,488 A | * | 2/2000 | Hua et al. ............... 342/357.12 |
| 6,114,975 A | * | 9/2000 | Guillard ...................... 340/945 |
| 6,172,639 B1 | * | 1/2001 | McDonald ............. 342/357.06 |

OTHER PUBLICATIONS

Bennet, Peter, "The NMEA FAQ", Version 6.3, Apr. 25, 2000.

* cited by examiner

Primary Examiner—William A Cuchlinski, Jr.
Assistant Examiner—Olga Hernandez
(74) Attorney, Agent, or Firm—Renner, Otto, Boisselle & Sklar, LLP

(57) ABSTRACT

A speedometer unit that uses a standard output of a position determining navigation unit such as a LORAN, GPS, SAT/NAV, OMEGA, or other type navigation unit. The speedometer includes a processor, such as a conventional microprocessor, that has an input for receiving speed information from the navigation unit, which speed information preferably is outputted according to the National Marine Electronics Association (NMEA) 0183 interface standard. The speed information, which according to such standard is outputted in knots per hour, may be converted to miles per hour for display on an analog or digital display disposed in a housing containing the processor. A push button switch or other input device may be provided for controlling an operational mode of the speedometer, for selecting the information displayed on the display and/or for resetting the speedometer.

12 Claims, 1 Drawing Sheet

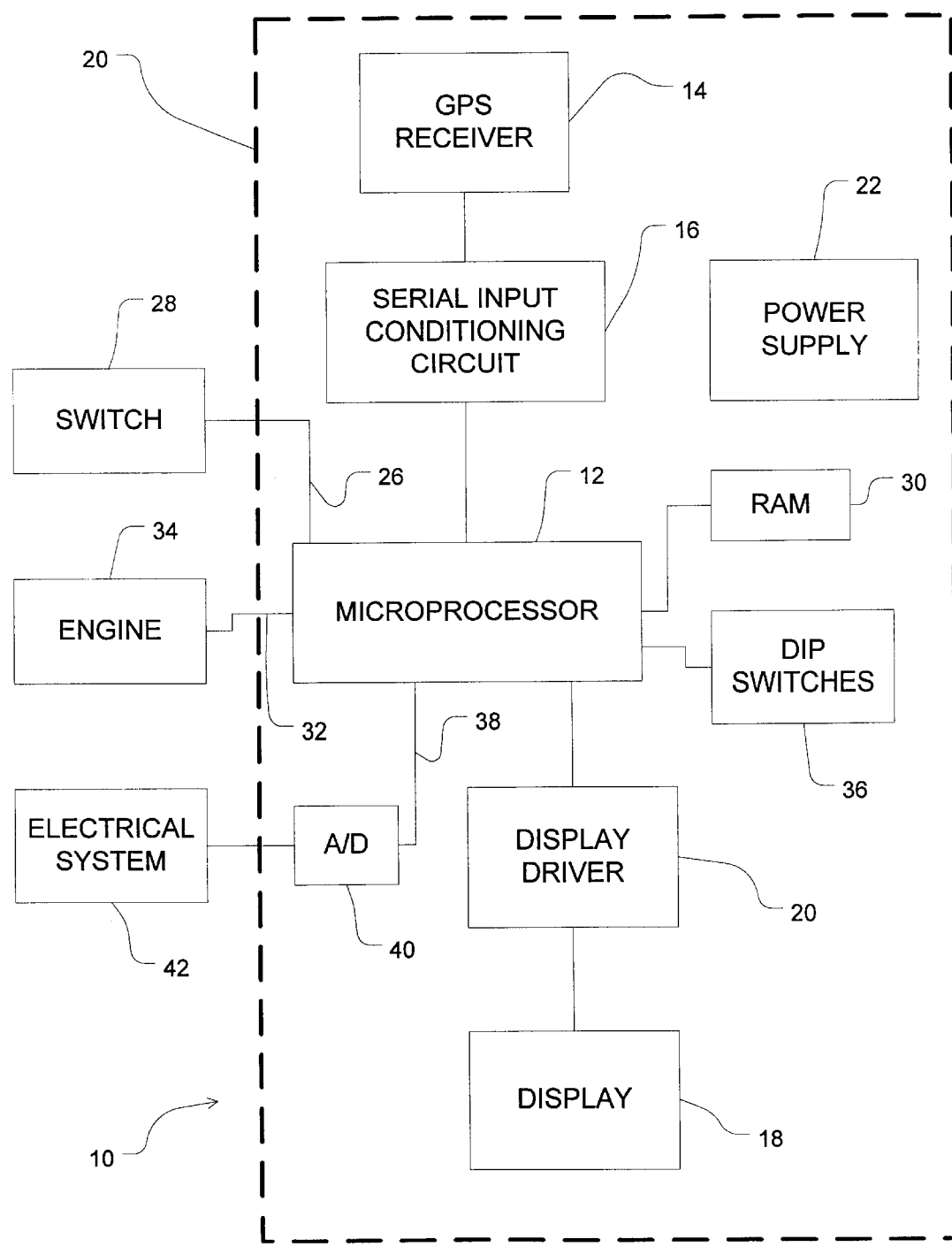

GPS CONTROLLED MARINE SPEEDOMETER UNIT WITH MULTIPLE OPERATIONAL MODES

The invention herein described relates generally to speedometers for the sensing and display of boat speed and more particularly to a Global Positioning System (GPS) controlled marine speedometer unit which eliminates problems associated with fouling or jamming of impellers utilized to sense boat speed.

BACKGROUND OF THE INVENTION

Marine speedometers, or knotmeters, heretofore have used water movement past an impeller or pilot tube to provide a signal related to the speed of a boat. One of the problems with impeller-type or pilot tube-type speedometers is that the impeller or pilot tube can become fouled both by barnacles, plants and debris in the water. Fouling of the impeller or pilot tube renders the speedometer useless and requires cleaning of the impeller or pilot tube to render the speedometer once again useful. In addition, impeller-type and pilot-tube type speedometers are inexact, particularly when a boat is skipping across the water such that flow of water across the impeller or pilot tube is intermittently interrupted.

SUMMARY OF THE INVENTION

The present invention provides a speedometer unit that uses a standard output of a position determining navigation unit such as a LORAN, GPS, SAT/NAV, OMEGA, or other type navigation unit. The speedometer includes a processor, such as a conventional microprocessor, that has an input for receiving speed information from the navigation unit, which speed information preferably is outputted according to the National Marine Electronics Association (NMEA) 0183 interface standard. The speed information, which according to such standard is outputted in knots per hour, may be converted to miles per hour for display on an analog or digital display disposed in a housing containing the processor.

In a preferred embodiment, the processor has a further input for connecting to an input device, such as a push button switch, for controlling an operational mode of the speedometer, for selecting the information displayed on the display and/or for resetting the speedometer. Preferably, the processor is programed to store the top speed encountered since the speedometer was reset. The pushbutton may be used in a speed display mode to switch between real time speed display and display of the top speed. The top speed memory may be reset, for example, by holding the pushbutton down for a minimum specified time greater than the depress time needed to switch between speed modes or other operational modes of the speedometer.

In a preferred embodiment, the speedometer is further provided with a tachometer, the function of which may be performed by the same processor used for processing speed, or by another processor. The tachometer receives an input signal from the boat's engine which is related to the rotational speed of the engine. Preferably, the processor can be selectively set to control the number of active digits that are displayed on a display panel to provide for faster updates or for more precise readouts. For example, a four digit display may be set to provide four active digits at a slower update rate, two active digits at a faster update rate, or three active digits at an intermediate update rate. Provision is made to store in memory for recall the top RPM since the tachometer was last reset.

Further in accordance with the invention, the speedometer may have a further input for receiving an operating voltage of the boat's engine and may operate in a voltage mode for display of the voltage on the display panel. Another operational mode may be provided to display boat heading based on the heading information received from the navigation unit. As above noted, the pushbutton may be used to switch between the several operational modes of the unit and/or to reset the unit.

The foregoing and other features of the invention are hereinafter fully described and particularly pointed out in the claims, the following description and the annexed drawings setting forth in detail one or more illustrative embodiments of the invention, such being indicative, however, of but one or a few of the various ways in which the principles of the invention may be employed.

BRIEF DESCRIPTION OF THE DRAWINGS

The sole figure is a diagrammatic representation of a speedometer unit according to the invention.

DETAILED DESCRIPTION

Referring now in detail to the drawing, an exemplary speedometer unit 10 according to the invention comprises a processor 12, such as a conventional microprocessor, that has an input for receiving speed information from a position determining navigation unit 14, such as via a serial input conditioning circuit 16. The navigation unit 14 may be a LORAN, GPS, SAT/NAV, OMEGA, or other type navigation unit. The speed information preferably is outputted according to the National Marine Electronics Association (NMEA) 0183 interface standard (or other standard that may be applicable). The speed information, which according to such standard is outputted in knots per hour, may be converted by the processor to miles per hour for display on an analog or digital display 18 via a display driver 20. The processor, serial input conditioning circuit, display and display driver preferably are disposed in a housing 22, along with a power supply 22 that may be connected to an external source of power in a conventional manner. The navigation unit 14 may also be included in the housing 20, although it is anticipated that the more typical application of the speedometer unit will take advantage of an existing navigation unit with which a boat is equipped for navigation purposes. The various components of the speedometer unit may be off-the-shelf components as is desired for providing a low cost, yet highly functional and accurate, speedometer unit having the herein described features.

While LORAN and OMEGA type navigation type units will work, their integration times are relatively slow such that the speed update may not be sufficiently fast. However, with the current GPS (Global Positioning Satellite) system, speed updates are available at as little an interval as sixtenths of a second. This provides for virtually instantaneous speed readings being available on the NMEA 0183 output of the navigation unit. The standard NMEA 0183 speed sentence is readily decodable into a number representing the calculated speed.

The processor 12 has a further input 26 for connecting to an input device 28, such as a push button switch, for controlling an operational mode of the speedometer, for selecting the information displayed on the display and/or for resetting the speedometer. Preferably, the processor 12 is programed to store the top speed encountered since the speedometer was reset, as in random access memory (RAM) 30. The pushbutton may be used in a speed display mode to switch between real time speed display and display of the top speed. The top speed memory may be reset, for example, by holding the pushbutton down for a minimum specified time greater than the depress time needed to switch between speed modes or other operational modes of the speedometer.

In a preferred embodiment, the speedometer unit is further configured to function as a tachometer, i.e., the tachometer function may be performed by the same processor 12 used for processing speed, or by another processor. The processor has a further input 32 for receiving an input signal from the boat's engine 34 which is related to the rotational speed of the engine. Preferably, the processor can be selectively set to control the number of active digits that are displayed on the display 18 to provide for faster updates or for more precise readouts. The display may include, for example, a four digit display panel, and the four digit display may be set, for example by setting dip switches 36, to provide four active digits at a slower update rate, two active digits at a faster update rate, or three active digits at an intermediate update rate. Provision may be made to store in memory 30 for recall the top RPM since the tachometer was last reset.

The input 32 may be connected to the spark ignition system and receive a voltage input for each spark ignition signal. In this event, the dip switches 36 include switches for indicating to the processor whether the engine is a four, six or eight cylinder engine.

The speedometer unit may have a further input 38 for receiving an operating voltage via an analog-to-digital converter 40 from the boat's engine or, more generally, the boat's electrical system 42. The speedometer unit may operate in a voltage mode for display of the voltage on the display panel 18.

The processor 12 may also be programmed for operation in another operational mode for display of the boat heading based on the heading information received from the navigation unit 14.

As above noted, the pushbutton 28 may be used to switch between the several operational modes of the unit and/or to reset the unit. The processor continuously monitors the pushbutton.

Although the invention has been shown and described with respect to certain preferred embodiments, equivalent alterations and modifications will occur to others skilled in the art upon reading and understanding this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

What is claimed is:

1. A marine speedometer unit for use with a marine navigation unit that repetitively provides a coded signal indicating calculated speed, comprising a housing suitably configured for mounting on an operating panel of a boat; an indicator located at a face of the housing for displaying boat speed; and a processor located in the housing, the processor having an output connected to the indicator and an input for receiving the coded signal from the navigation unit, and the processor being operative to monitor and process the coded signal for display of the calculated speed on the indicator, wherein the processor converts the calculated speed from knots per hour to miles per hour.

2. A marine speedometer unit as set forth in claim 1, including a top speed memory for storage of a top speed processed by the processor.

3. A marine speedometer unit as set forth in claim 2, including a reset device for resetting the top speed memory.

4. A marine speedometer unit as set forth in claim 1, including a signal conditioner for conditioning the coded signal before the coded signal is supplied to the input of the processor.

5. A marine speedometer unit as set forth in claim 1, including a tachometer input for receiving a tachometer input signal having relation to engine revolutions, and the processor is operative to process the tachometer input signal for display of engine revolutions per minute (RPM) on the indicator.

6. A marine speedometer unit as set forth in claim 5, including a top RPM memory for storage of a top RPM processed by the processor.

7. A marine speedometer unit as set forth in claim 1, wherein the indicator includes a scale and pointer.

8. A marine speedometer unit as set forth in claim 1, including a voltage input for receiving a voltage input signal corresponding to engine voltage, and the processor is operative to process the voltage input signal for display of engine voltage on the indicator.

9. A marine speedometer unit as set forth in claim 1, wherein the indicator includes a digital display.

10. A marine speedometer unit for use with a marine navigation unit that repetitively provides a coded signal indicating calculated speed, comprising a housing suitably configured for mounting on an operating panel of a boat; an indicator located at a face of the housing for displaying boat speed; and a processor located in the housing, the processor having an output connected to the indicator and an input for receiving the coded signal from the navigation unit, and the processor being operative to monitor and process the coded signal for display of the calculated speed on the indicator, wherein the processor is operative to process directional information carried by the coded signal for display on the indicator, and wherein the processor has a mode selector input for connecting to a pushbutton that is used to toggle the unit between different operational modes for display of boat speed and boat direction.

11. A marine speedometer unit for use with a marine navigation unit that repetitively provides a coded signal indicating calculated speed, comprising a housing suitably configured for mounting on an operating panel of a boat; an indicator located at a face of the housing for displaying boat speed; and a processor located in the housing, the processor having an output connected to the indicator and an input for receiving the coded signal from the navigation unit, and the processor being operative to monitor and process the coded signal for display of the calculated speed on the indicator including a tachometer input for receiving a tachometer input signal having relation to engine revolutions, and the processor is operative to process the tachometer input signal for display of engine revolutions per minute (RPM) on the indicator, wherein the indicator has a multiple digit display for displaying RPM, and a setting device is provided for setting the number of active digits to be displayed on the multiple digit display and the update rate at which the active digits are updated.

12. A marine speedometer unit for use with a marine navigation unit that repetitively provides a coded signal indicating calculated speed, comprising a housing suitably configured for mounting on an operating panel of a boat; an indicator located at a face of the housing for displaying boat speed; and a processor located in the housing, the processor having an output connected to the indicator and an input for receiving the coded signal from the navigation unit, and the processor being operative to monitor and process the coded signal for display of the calculated speed on the indicator including a tachometer input for receiving a tachometer input signal having relation to engine revolutions, and the processor is operative to process the tachometer input signal for display of engine revolutions per minute (RPM) on the indicator, wherein the processor has a mode selector input for connecting to a pushbutton that is used to toggle the unit between different operational modes for display of boat speed and RPM.

* * * * *